United States Patent [19]

Susnjara

[11] Patent Number: 5,592,728
[45] Date of Patent: Jan. 14, 1997

[54] SLIDE ASSEMBLY FOR MACHINE TOOLS AND METHOD OF MAKING SAME

[75] Inventor: Kenneth J. Susnjara, Santa Claus, Ind.

[73] Assignee: Thermwood Corporation, Dale, Ind.

[21] Appl. No.: 625,907

[22] Filed: Apr. 1, 1996

Related U.S. Application Data

[62] Division of Ser. No. 390,754, Feb. 17, 1995.
[51] Int. Cl.$^6$ .............................. B21D 53/10; B23P 11/00; F16C 33/10
[52] U.S. Cl. .................... 29/434; 29/525.13; 29/898.03; 29/DIG. 1; 384/13; 384/39; 384/42; 144/48.1; 409/212; 409/235
[58] Field of Search ...................... 29/26 A, 432, 29/434, 525.1, 898.02, 898.03, 898.15, DIG. 1; 144/1.1, 3.1, 48.1; 384/7, 13, 41, 42, 39, 220, 297, 300; 409/190, 206, 212, 223, 235, 236

[56] References Cited

U.S. PATENT DOCUMENTS

| | | | |
|---|---|---|---|
| 2,167,609 | 7/1939 | Dolle | 29/898.03 |
| 2,675,276 | 4/1954 | Daugherty | 29/898.03 |
| 3,115,696 | 12/1963 | Evans | 29/898.03 |
| 4,706,352 | 11/1987 | Furmanek et al. | 29/434 |

*Primary Examiner*—W. Donald Bray
*Attorney, Agent, or Firm*—Lalos & Keegan

[57] ABSTRACT

A slide assembly for a machine tool generally consisting of a first member having at least one guide slot disposed parallel to a given line of travel, provided with at least one wall portion, a second member disposed in a predetermined spatial relation relative to the first member, having a portion thereof protruding into the guide slot, spaced from the slot wall portion and displaceable along the guide slot when the members are disposed in the predetermined spatial relation, detachable means for fastening the members together in the predetermined spatial relation relative to each other, and a structural polymer disposed in the guide slot adhesively secured to one of the protruding portion of the second member and the slot wall of the first member, and slidably engageable with the other of the protruding portion of the second member and slot wall portion of the first member, providing a guideway for one of such members relative to the other whereby upon applying the fastening means and thereby positioning the second member in the predetermined spatial relation relative to the first member, when forming the guideway, the structural polymer in a prehardened fluid state may be injected into the space between the protruding portion of the second member and the slot wall portion of the first member.

6 Claims, 4 Drawing Sheets

SLIDE ASSEMBLY FOR MACHINE TOOLS AND METHOD OF MAKING SAME

This is a divisional of application Ser. No. 08/390,754, filed on Feb. 17, 1995.

This invention relates to machine tools and more particularly to a slide assembly for machine tools and a method of initially forming and subsequently replacing the guideways of such an assembly.

One type of machine tool used extensively in machining wood, plastic and non-ferrous workpieces generally consists of a base, a worktable mounted on the base which may be either stationery or slidably displaceable along a longitudinal or x-axis, a gantry mounted on the base which may be either stationery or slidably displaceable along the x-axis, a toolhead support assembly mounted on the gantry which is slidably displaceable along a transverse or y-axis, and a toolhead mounting assembly mounted on the toolhead support assembly which is slidably displaceable along a vertical or z-axis. Conventionally, sliding displacement between cooperating members of such machines has been provided by hardened steel rails disposed on one component and cooperating linear bearings disposed on the other component. More recently, such sliding engagements have been formed of structural polymers which typically are formed simply by positioning the mating portions of two cooperating machine components together in spaced relation, applying a release agent to one of the sets of mating surfaces, injecting the structural polymer in an urn hardened or uncured viscous state in the space between the opposed mating surfaces of the machine members and then allowing the polymer to set or cure to provide a molding adhesively secured to one of the members, forming a rail for the other member.

In forming guideways with the use of structural polymers in the manner as described, it is essential to properly align the mating surfaces of the machine members. Typically, fixturing devices are used to properly position the components relative to each other for injecting the structural polymer. The use of such fixturing devices, however, has been found to be disadvantageous because of the investment cost of such devices, the cost in labor in utilizing such devices and the possible misalignment of the cooperating machine members due to misuse, defective design or eventual wear of such devices. It thus has been found to be desirable to provide an improved method of forming such guideways which eliminates the aforementioned disadvantages attendant to the use of conventional fixturing devices.

Accordingly, it is the principal object of the present invention to provide an improved slide assembly suitable for use in machine tools.

Another object of the present invention is to provide an improved slide assembly for machine tools having accurately formed mating slide surfaces.

A further object of the present invention is to provide an improved slide assembly for machine tools having accurately aligned cooperating components.

A still further object of the present invention is to provide an improved slide assembly for machine tools in which the rail or trackway of one of the cooperating machine components is formed of a molded structural polymer.

Another object of the present invention is to provide a novel method of forming a slide assembly for machine tools.

A further object of the present invention is to provide a novel method of forming a slide assembly for machine tools without the use of conventional fixturing devices.

A still further object of the present invention is to provide a novel method of forming the rail or trackway portion of a slide arrangement of cooperating machine components, formed of a molded structural polymer.

Another object of the present invention is provide a novel method of forming a rail or trackway of a slide arrangement of cooperating machine components, formed of a molded structural polymer, which does not require the use of special fixturing devices for positioning the cooperating machine components relative to each other.

A further object of the present invention is to provide a slide assembly for machine tools utilizing a molded structural polymer as a rail or trackway of one of such components in which such rail or trackway may be replaced without either disassembling the machine components or requiring any special fixturing devices.

A still further object of the present invention is to provide a novel method of initially forming or replacing a rail or trackway of a slide assembly of a pair of cooperating machine members which is simple in procedure, easy to perform and inexpensive to accomplish.

Other objects of the present invention will become more apparent to those persons having ordinary skill in the art to which the present invention pertains from the following description, taken in conjunction with the accompanying drawings, wherein.

Figure 1:
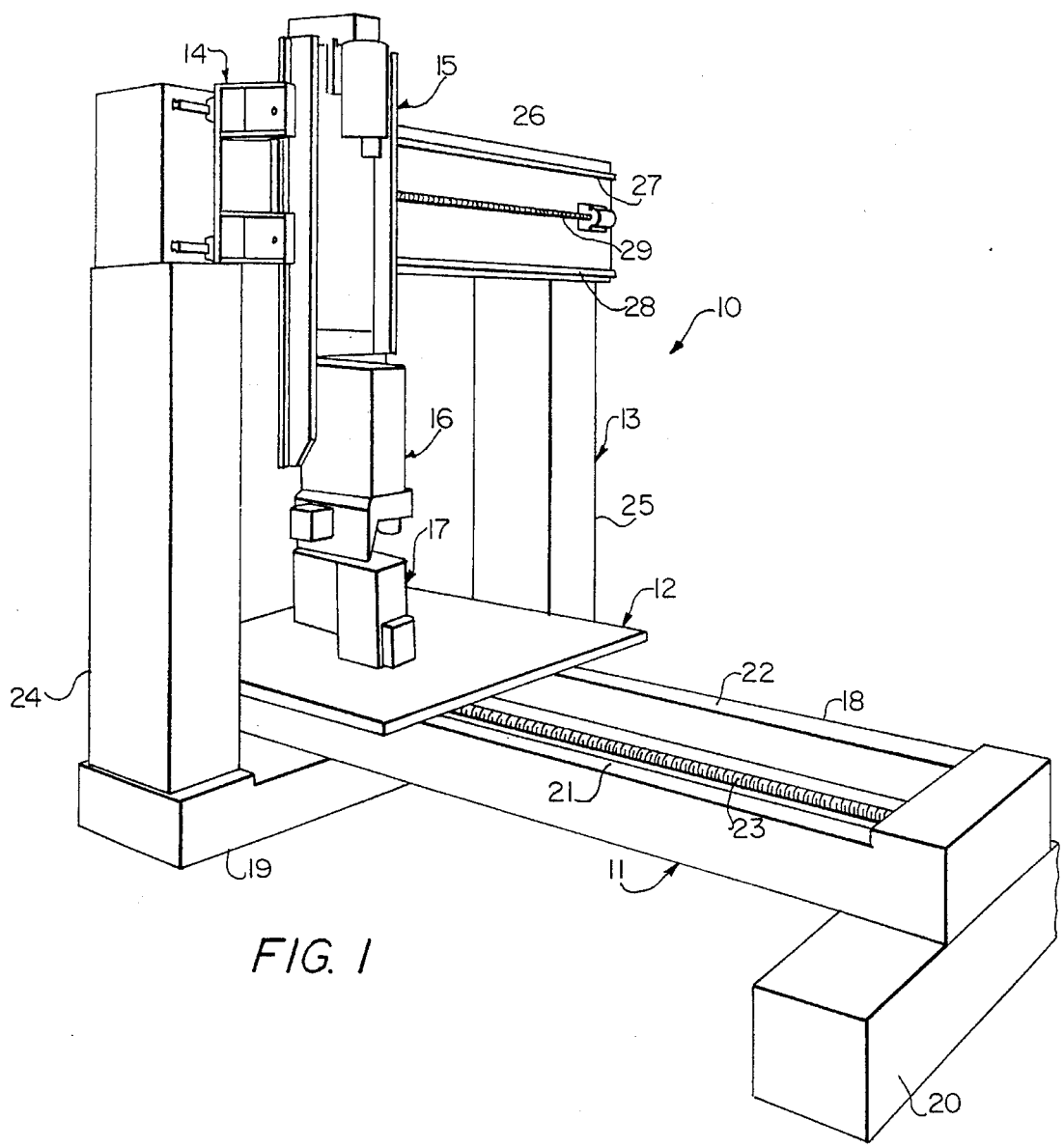
FIG. 1 is a perspective view of a machine embodying the present invention.

Referring to FIG. 1 of the drawings, there is illustrated a machine 10 embodying the present invention which includes a base 11, a worktable 12 mounted on the base member and adapted to be displaced longitudinally or along an x-axis, a gantry 13 mounted on the base member, a toolhead support assembly 14 mounted on the gantry and adapted to be displaced transversely or along a y-axis, a toolhead mounting assembly 15 mounted on the toolhead support assembly and adapted to be displaced vertically or along a z-axis and toolhead 16 mounted on the toolhead mounting assembly and having a working tool such as a router bit, drill, rotary saw or the like adapted to perform a work function on a workpiece 17 positioned and held down on worktable 12. Base member 11 generally includes a longitudinally disposed section 18 supported on a pair of transversely disposed sections 19 and 20. Provided on longitudinal section 18 is a pair of transversely spaced trackways 21 and 22 on which moveable worktable 12 is supported for displacement along the x-axis. The underside of worktable 12 is provided with sets of linear bearings which seat on and are adapted to ride along trackways 21 and 22. Displacement of the worktable along the x-axis is effected by a feed screw 23 journaled at its ends in bearings provided in the base member and operatively connected intermediate the ends thereof to a ball nut device mounted on the underside of the worktable.

Gantry 13 consists of a pair of column sections 24 and 25 mounted at their lower ends on transverse base section 19, flanking worktable 12 in the position as shown in FIG. 1, and an upper, transversely disposed section 26. The forwardly disposed wall portion of section 26 is provided with a pair of transversely disposed, vertically spaced trackways 27 and 28 on which toolhead support assembly 14 is mounted, and a transversely disposed feed screw 29 which cooperates with a ball nut device on the toolhead support assembly for displacing the assembly along trackways 27 and 28 or the y-axis.

Figure 2:
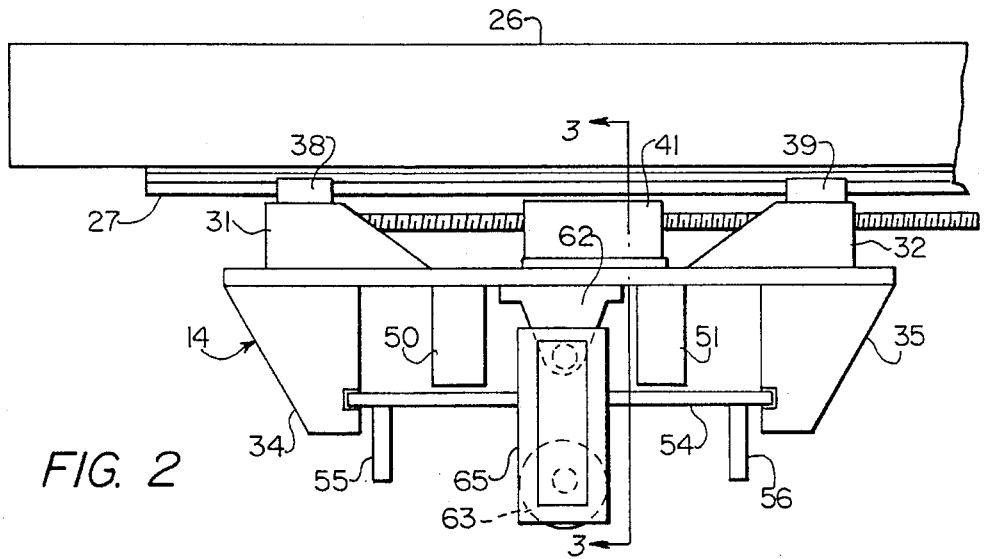
FIG. 2 is an enlarged top plan view of a portion of the machine shown in FIG. 1.
Figure 3:
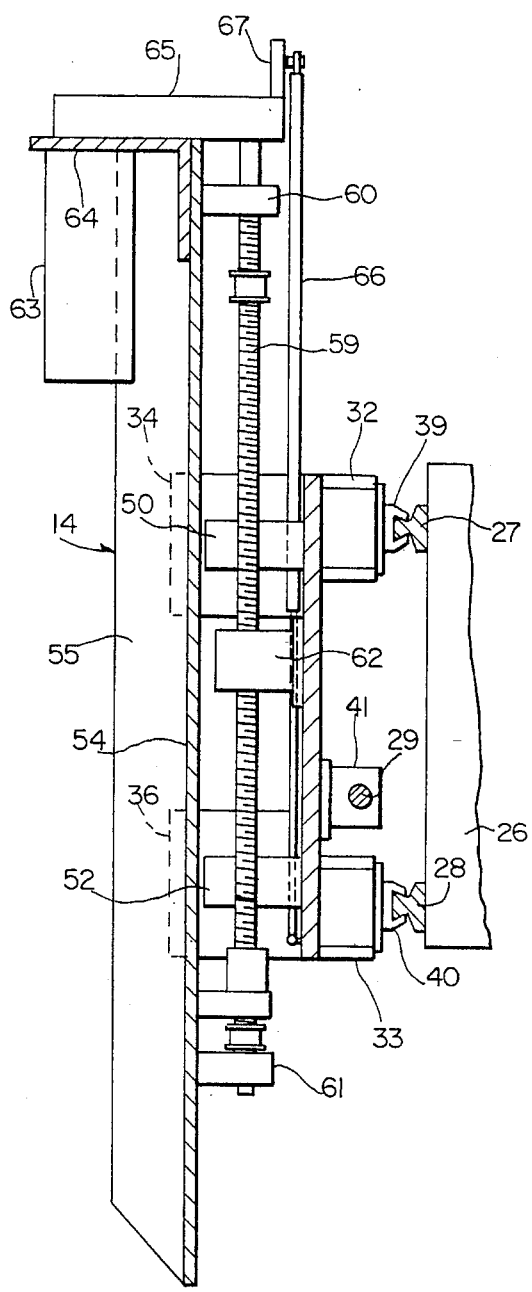
FIG. 3 is a cross-sectional view taken along line 3—3 in FIG. 2.
Figure 8:
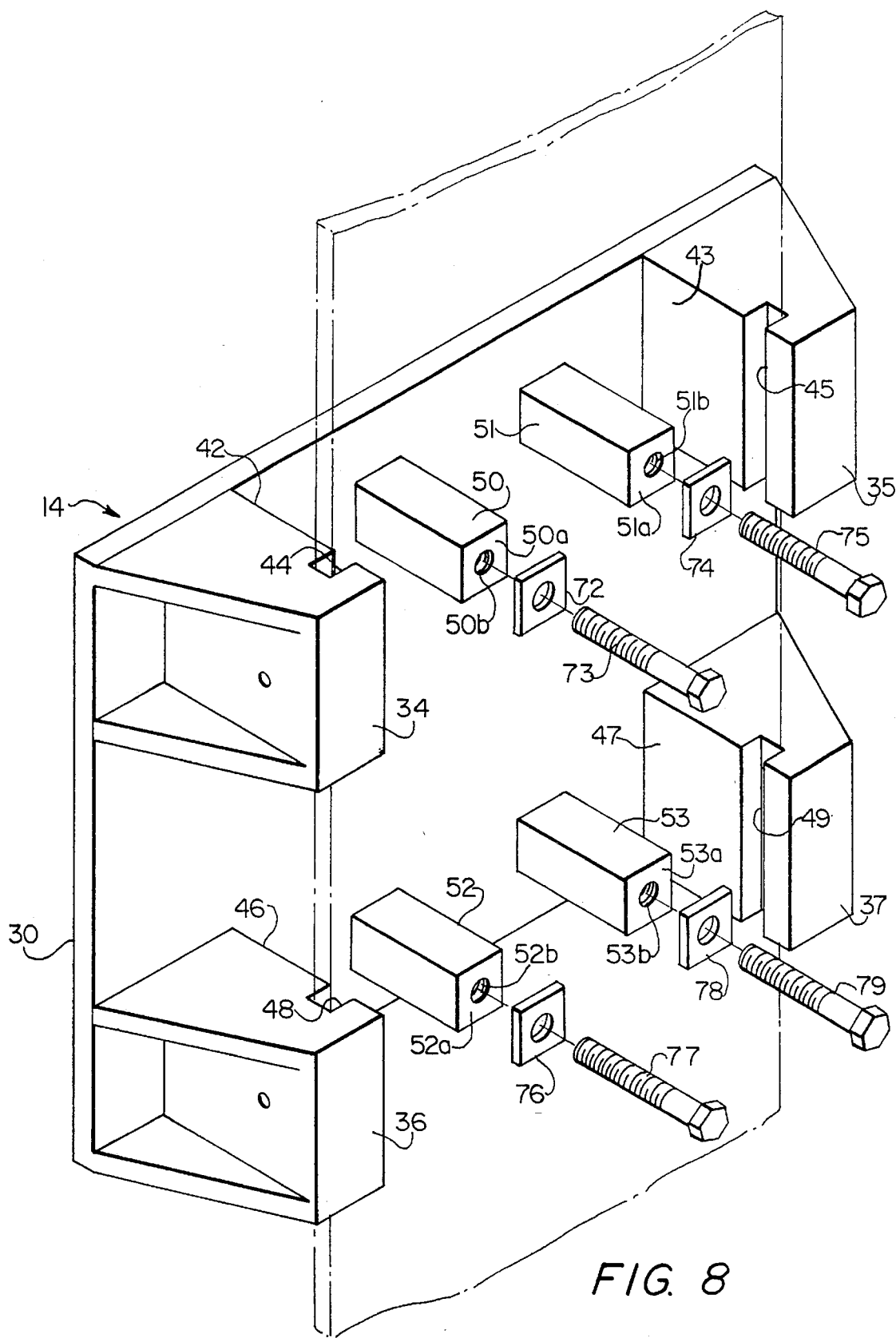
FIG. 8 is an enlarged perspective view of the toolhead support assembly of the machine shown in FIG. 1, illustrating several of the components thereof in exploded relation.

As best shown in FIGS. 2, 3 and 8, toolhead support assembly 14 consists of a plate section 30, an upper set of transversely spaced, rearwardly projecting boss sections 31 and 32, a lower set of transversely spaced, rearwardly projecting boss sections 33, 33 an upper set of transversely spaced, forwardly projecting boss sections 34 and 35 and a lower set of transversely spaced, forwardly projecting boss sections 36 and 37. The assembly is supported and moveable along trackways and 27 and 28 by means of linear bearings 38 and 39 mounted on upper boss sections 31 and 32 which are operatively connected to trackway 27, and linear bearings 40, 40 mounted on lower boss sections 33, 33 and operatively connected to trackway 28. Displacement of assembly 14 is effected by the rotation of feedscrew 29 operatively connected to a ball nut device 41 mounted on the rear side of plate section 30 of the assembly.

As best shown in FIG. 8, opposed, inwardly facing surfaces 42 and 43 of boss sections 34 and 35 are provided with inwardly opening, vertically disposed guide slots 44 and 45. Similarly, inwardly facing surfaces 46 and 47 of lower boss sections 36 and 37 are provided with inwardly opening, vertically disposed guide slots 48 and 49. Guide slots 44 and 45 are transversely aligned relative to each other and guide slots 48 and 49 are similarly aligned relative to each other. In addition, guide slots 44 and 48 are vertically aligned and guideslots 45 and 49 similarly are vertically aligned, so that such slots lie in a common vertical plane and are adapted to guide the toolhead mounting assembly vertically or along the z-axis as will be described later.

Figure 7:
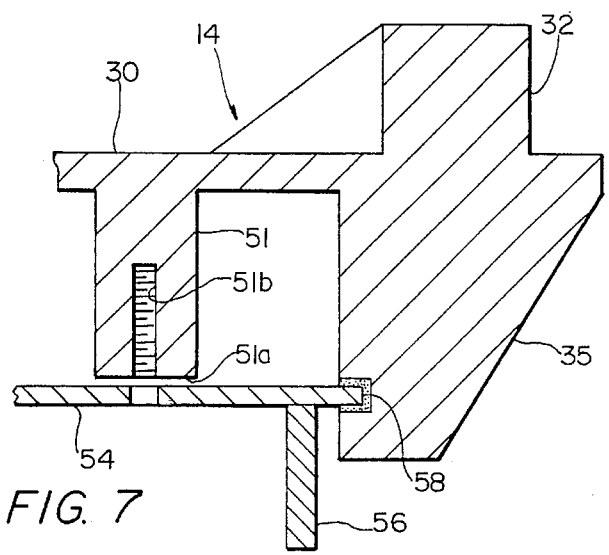
FIG. 7 is a view similar to the view shown in FIG. 6 at a subsequent stage in the formation of such rail or trackway.

As shown in FIG. 7, each of slots 44, 45, 48 and 49 is provided with a lining of a molded structural polymer material adhesively secured to the side and bottom walls of the slot to provide sliding surfaces for the toolhead mounting assembly. In addition, plate section 30 is provided with a set of forwardly projecting positioning boss sections 50 through 53 providing abutment surfaces 50a through 53a which lie in a common, transverse plane disposed forwardly a distance no greater than a plane including the inner sidewall surfaces of the guide slots. Each of abutment surfaces 50a through 53a is provided with threaded openings 50b through 53b.

Figure 4:
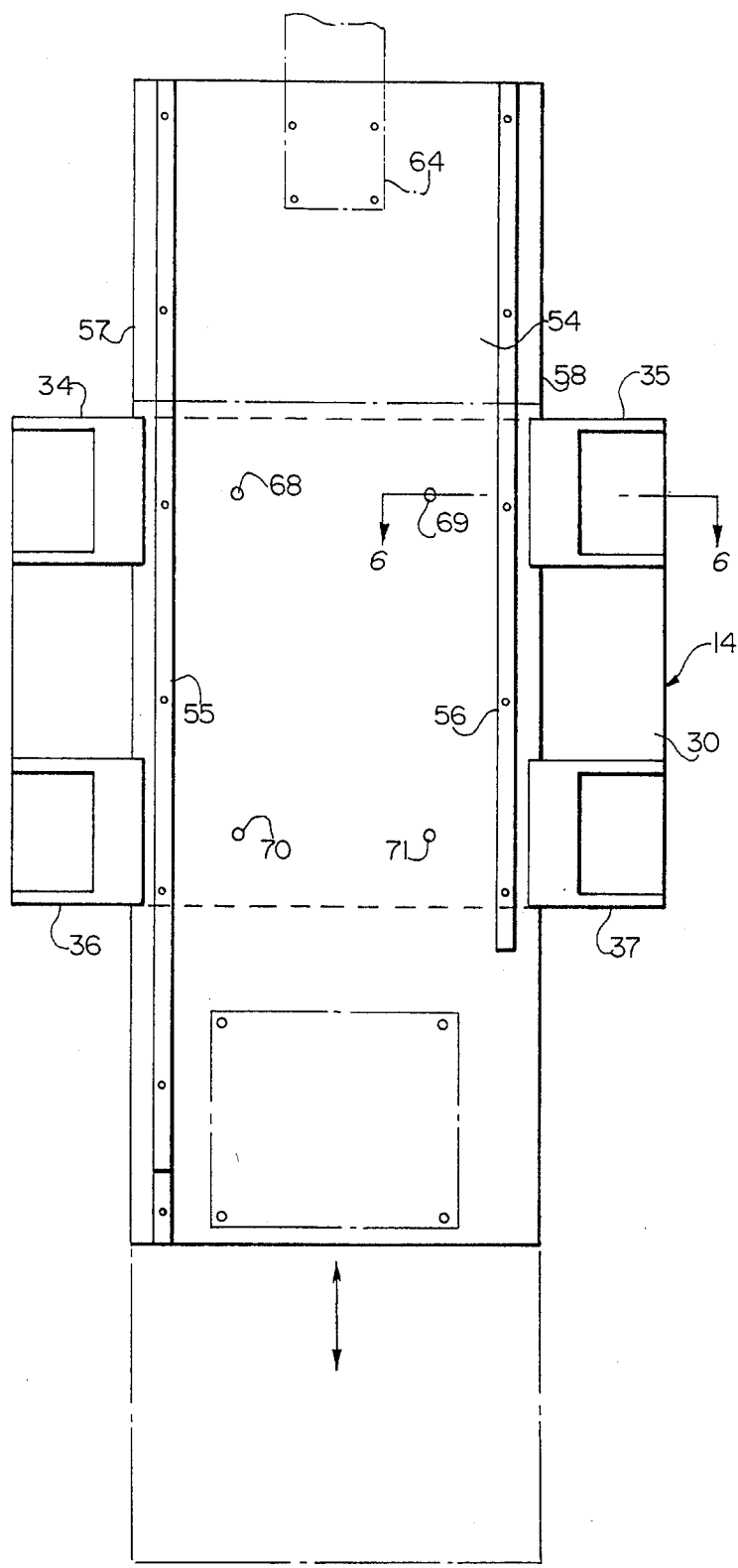
FIG. 4 is a front elevational view of portions of the toolhead support assembly and toolhead mounting assembly of the machine shown in FIG. 1.
Figure 5:
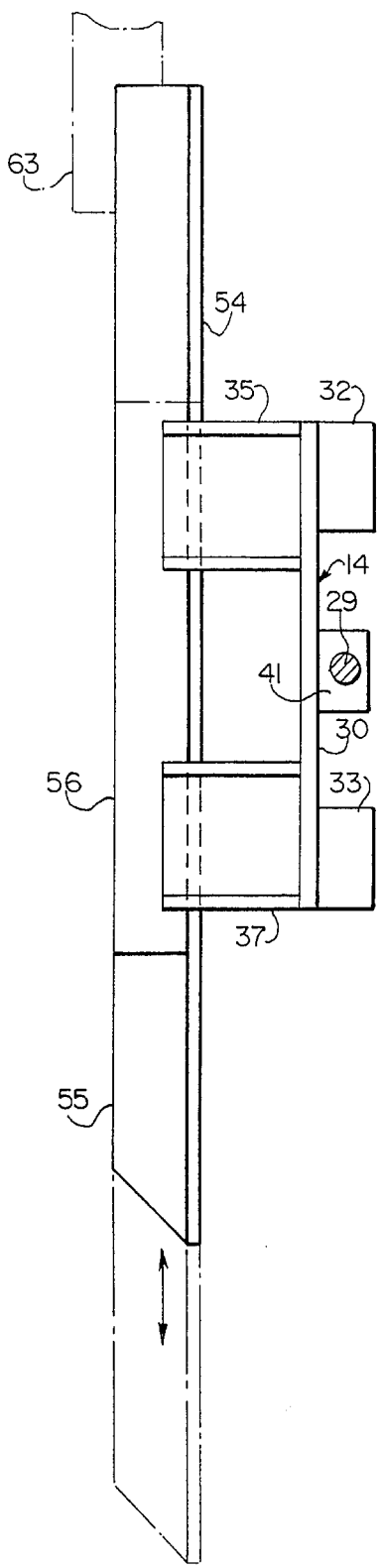
FIG. 5 is a side elevational view of the assemblies shown in FIG. 4.

Toolhead mounting assembly 15 essentially includes an elongated plate member 54 provided with a pair of transversely spaced support brace members 55 and 56 as best shown in FIGS. 4 and 7. Support brace members 55 and 56 are provided on the front face of plate member 54 and inwardly relative to side edges 57 and 58 of plate member 54 which extend into guide slots 44, 45, 48 and 49, in sliding engagement with the molded structural polymer linings thereof.

Assembly 15 is adapted to be displaced vertically along the z-axis relative to assembly 14 by means of a vertically disposed feed screw 59 journaled in upper and lower brackets 60 and 61 provided on the rear side plate member 54 and operatively connected to a ball nut device 62 mounted on the front face of plate section 30 of assembly 14. The feed screw is driven by a motor 63 mounted on a bracket 64 secured to the upper end of plate member 54, by means of a belt drive arrangement disposed in a housing 65 also mounted on bracket 64. A shock absorber 66 further is provided interconnecting a bracket 67 on drive housing 65 and a lower portion of plate section 30 in the usual manner.

The machine as described is provided with drive motors operatively connected to feed screws 23, 29 and 59 which are operated by a controller to execute a program downloaded or inputted into the computer in the convention manner. Operation of the motor for feedscrew 23 will cause worktable 12 to be displaced along the x-axis of the machine. Operation of the motor for feedscrew 29 will cause toolhead support assembly 14 and correspondingly toolhead 16 to be displaced along the y-axis. Similarly, operation of electric motor 63 will drive feedscrew 59 to displace the toolhead mounting assembly and toolhead 16 along the z-axis.

Figure 6:
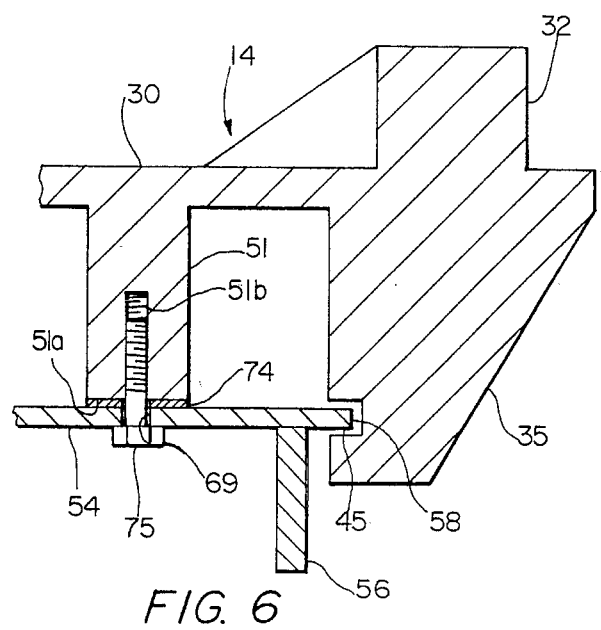
FIG. 6 is a enlarged cross-sectional view taken along line 6—6 in FIG. 4, illustrating mating components of the machine at an initial stage in the formation of the rail or trackway of one of two cooperating members of the machine.

In the assembly of the machine as described, with the toolhead support assembly mounted on the gantry as shown in FIGS. 1 through 3, the toolhead mounting assembly is mounted on the support assembly in the manner as shown in FIG. 6 with side edge portions 57 and 58 of plate member 54 extending into the guide slots but spaced from the side and bottom wall portions thereof. This positioning of the side edge portions of plate member 54 within the guide slots is accomplished by registering a set of holes 68 through 70 in plate member 54 with threaded openings 50b through 53b, respectively, in boss sections 51 through 53, aligning an opening in a shim 72 with registered openings 68 and 50b and inserting and threading a threaded bolt 73 therein, aligning an opening in a shim 74 with registered openings 69 and 51b and inserting and threading a threaded bolt 75 therein, positioning an opening in a shim 76 with aligned openings 70 and 52b and inserting and threaded bolt 77 therein and similarly aligning an opening in a shim 78 with registered openings 71 and 53b and inserting and threading therein a threaded bolt 79. Each of the shims will thus be interposed between an abutment surface of positioning boss sections 50 through 53 and plate member 54 to properly position side edge portions 57 and 58 in aligned guide slots as shown in FIG. 6. The thicknesses of the shims are selected to provide the desired spacing. The desired spacing between the side edge portions of plate member 54 and the bottom wall portions of the guide slots is provided by the proper selection of the dimensions between side edge portions 57 and 58 of plate member 54 and the center lines of holes 68 through 71, and between the bottom wall portions of guide slots 44, 45, 48 and 49 and the center lines of threaded openings 50b through 53b. As best shown in FIG. 6, it will be noted that the selected thickness of shim 74 cooperating with the other three shims will position side edge portion 58 within guide slot 45, spaced from the sidewall portions thereof, and that the dimension from side edge portion 58 to the center line of opening 69 being smaller than the dimension from the bottom wall portion of guide slot 45 to the centerline of threaded opening 51b will cause side edge portion 58 to be spaced from the bottom wall portion of guide slot 45, to provide a spacing having a C-shaped cross-sectional configuration between side edge portion 58 and the side and bottom walls of the guide slot.

With the mating components in position as shown in FIG. 6, the guideway for the toolhead mounting assembly may be formed by providing suitable barrier means to close the openings of the slots where the guideways are to be formed and injecting an unhardened or uncured structural polymer into the space between the side edge portions 57 and 58 of plate member 54 and the side and bottom wall portions of the guide slots so that the polymer will harden or cure to provide a molded structural polymer adhesively secured to the side and bottom wall portions of the guide slots, forming a rigid guideway in sliding engagement with side edge portions 57 and 58. The structural polymer is prevented from adhering to side edge portions 57 and 58 by applying a release agent to such edge portions prior to injecting the structural polymer into the guide slots to form the guideways. After plate member 54 has been connected to feedscrew 59 so that it is properly supported on support assembly 14, bolts 73, 75, 77 and 79 and shims 72, 74, 76 and 78 may be removed so that section 54 will be free to be displaced along the z-axis upon operation of feedscrew 59 with side edge portions 57 and 58 of plate member 54 being guided in the guideways provided in the structural polymer material disposed in the guide slots.

The structural polymer used to form the guideways for plate member 54 preferably is an epoxy-based structural polymer having a low coefficient of friction, high wear properties, low abrasion rates, resistance to chemicals and coolants, a high compression strength and long-term dimensional stability to provide a finished bearing surface for the toolhead mounting assembly. The material should have a compression strength in the order of 23,000 psi and may be simply poured or otherwise injected into the spaces between side edge portions 57 and 58 and the side and bottom wall portions of the guide slots. A suitable structural polymer for such use has been found to be a polymer manufactured and sold by Diamant Metallplastic GMbH of Monchengladbach, Germany, under the the trademark MOGLICE. Such material is an epoxy-based structural polymer which may be used in the form of a viscous fluid having the consistency of gear oil or in the form of a putty. Preferably, the material is used in the form of a viscous fluid and is injected into the lower areas of the guide slots to force out the air in such spaces thus preventing any air pockets or voids along the surfaces of side edge portions 57 and 58, and precisely replicating the surfaces of the side edge portions of plate member 54. Upon the curing of the polymer and the removal of the bolts and shims as described, there will be provided sliding surfaces in the bodies of structural polymer bonded to the side and bottom wall portions of the guide slots replicating the configurations of the side edge portions of plate member 54 and having the structural integrity and dimensional stability of a machine metallic surface. To enhance the lubricity of the sliding surfaces, the structural polymer used may be formulated with a lubricant such as molybdenum disulfide.

After the machine has been in service for a period of time and the guideways may have become worn, such guideways may be replaced merely by removing the old structural polymer material in the guide slots, again positioning plate member 54 of the toolhead mounting assembly relative to the toolhead support assembly as shown in FIG. 6 with the shims and bolts, and again injecting a new supply of structural polymer into the spaces between the side edge portions of plate member 54 and the side and bottom wall portions of the guide slots to form guideways having new sliding surfaces replicating the configurations of the side edge portions of plate member 54. The bolts and shims can then be removed to free the toolhead mounting section and permit its vertical displacement guided along the newly formed sliding surfaces provided by the newly molded polymer materials.

It will be appreciated that by detachably fastening the toolhead support and mounting assemblies together with the use of suitably dimensional shims and properly located bolts, the assemblies may be properly positioned relative to each other to permit the initial formation and subsequent replacement of guideways between the assemblies without the requirement of special fixturing devices.

From the foregoing detailed description, it will be evident that there are a number of changes, adaptations, and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A method of forming a sliding assembly for a machine tool consisting of a first member having at least one guide slot disposed parallel to a given line of travel and a second member disposed in a predetermined spatial relation relative to said first member and displaceable relative to said first member along said line of travel, having a side edge portion protruding into and displaceable along said guide slot, comprising:

inserting detachable means between said members to space said members and thereby position said protruding side edge portions spaced from and disposed between side wall portions of said guide slot;

positioning said second member relative to said first member whereby said protruding side edge portion is received within and spaced from a bottom wall portion of said guideslot;

applying detachable means for fastening said members together with said protruding side edge portion disposed in said guide slot, spaced from said side and bottom wall surfaces thereof;

injecting a structural polymer in a prehardened fluid state in the space between said protruding side edge portion of said second member and said side and bottom wall portions of said guide slot in said first member;

allowing said structural polymer to harden and adhere to one of said members to form a guideway on one of said members; and removing said spacing and fastening means to permit displacement of said members relative to each other along said line of travel.

2. A method according to claim 1 wherein a shim is used in spacing said members apart.

3. A method according to claim 1 wherein a pin is used in positioning said members relative to each other.

4. A method according to claim 1 including applying a release agent to one of said side and bottom wall portions of said guide slot of said first member and said protruding side edge portion of said side member to provide a sliding engagement between one of said members and said structural polymer in a hardened state.

5. A method according to claim 1 wherein said structural polymer comprises an epoxy-based structural polymer.

6. A method according to claim 1 wherein said polymer includes a lubricant.

* * * * *